United States Patent [19]
Beccia et al.

[11] 4,167,781

[45] Sep. 11, 1979

[54] MICROPROCESSOR SYSTEM HAVING A SINGLE CENTRAL PROCESSING UNIT SHARED BY A PLURALITY OF SUBSYSTEMS EACH HAVING A MEMORY

[75] Inventors: Anthony R. Beccia, Cupertino; Robert D. Boehlje, Los Gatos; Peter T. Jacobsen, Santa Cruz; Richard Olney, San Jose, all of Calif.

[73] Assignee: Fairchild Camera and Instrument Corporation, Mountain View, Calif.

[21] Appl. No.: 731,399

[22] Filed: Oct. 12, 1976

[51] Int. Cl.² .......................... G06F 3/04; G06F 9/18; G06F 13/00

[52] U.S. Cl. .......................................... 364/200

[58] Field of Search ... 364/200 MS File, 900 MS File

[56] References Cited

U.S. PATENT DOCUMENTS

| | | | |
|---|---|---|---|
| 3,412,382 | 11/1968 | Couleur et al. | 364/200 |
| 3,614,741 | 10/1971 | McFarland, Jr. et al. | 364/200 |
| 3,757,306 | 9/1973 | Boone | 364/200 |
| 3,793,631 | 2/1974 | Silverstein et al. | 364/200 |
| 3,798,615 | 3/1974 | Weisbecker | 364/200 |
| 3,878,514 | 4/1975 | Faber | 364/200 |
| 3,943,494 | 3/1976 | Holmes, Jr. et al. | 364/200 |
| 3,972,028 | 7/1976 | Weber et al. | 364/200 |
| 4,016,545 | 4/1977 | Lipovski | 364/200 |
| 4,045,782 | 8/1977 | Anderson et al. | 364/200 |
| 4,067,059 | 1/1978 | Derchak | 364/200 |
| 4,086,627 | 4/1978 | Bennett et al. | 364/200 |

*Primary Examiner*—Melvin B. Chapnick
*Attorney, Agent, or Firm*—Alan H. MacPherson; Paul J. Winters

[57] ABSTRACT

A microprocessor system wherein a plurality of programs shares a single central processing unit. A first subsystem includes a memory having a program counter for indicating the point of execution of a program and a data pointer indicating the location in memory of data processed by the program in execution. At least one other subsystem includes a memory having a program counter for indicating the point of execution of a program and a data pointer indicating the location in memory of data being processed by the program in execution in that subsystem. A console control module is interconnected with the system data bus and the first and second subsystems, and controls operation of the central processing unit with each subsystem. The subsystem not connected to the central processing unit indicates the point of interruption of program execution with the program counter and indicates the location of data being processed by the interrupted program.

3 Claims, 10 Drawing Figures

* NOP IS FETCHED TO ALLOW TRANSITION FROM RUN TO HALT WHILE CONSOLE ASSUMES COMMAND.

FIG. 9

```
CYCLE CLK   _⎍___⎍_____⎍__⎍__⎍___⎍__⎍_

ACTIVE SYSTEM  ──────── CONSOLE ────────│──── USER ────
```

| | | | | |
|---|---|---|---|---|
| INSTRUCTION BEING FETCHED | ──── | LAST CONSOLE INSTRUCTION | ──── | 1ST USER INSTRUCTION | ──── |
| INSTRUCTION BEING EXECUTED | ── STORE ── | | LAST CONSOLE INSTRUCTION* | ── | 1ST USER INSTRUCTION |

X. ARUN  ________⎍⎍________________

X. GO RUN  ________________⎍⎍⎍________

X. HALT  ______________________⎦____

USER ROMC  ──────── =NOP ──────── /FETCH ✕WHATEVER✕

CONSOLE ROMC  FETCH ✕WRITE RAM ✕ FETCH ✕ [LAST] \____ = RESET

*LAST CONSOLE INSTRUCTION IS PRIVILEGED.

MICROPROCESSOR SYSTEM HAVING A SINGLE CENTRAL PROCESSING UNIT SHARED BY A PLURALITY OF SUBSYSTEMS EACH HAVING A MEMORY

BACKGROUND OF THE INVENTION

1. Field of the Invention

This invention relates to microprocessor devices, and in particular to a microcomputer system having multiple but mutually exclusive operative memory units.

2. Prior Art

In the past, digital systems have been fabricated from a multiplicity of logic circuits such as AND or OR gates, flip-flops and the like. One or more of such logic circuits are integrated onto a single semiconductor chip. These logic circuits are commonly referred to in the art as small scale integration. Numerous small scale integrated logic circuits are assembled onto a board containing printed circuit interconnections between each of the individual logic circuits, and numerous such assembled boards are electrically interconnected for constructing programmable digital systems. These digital systems have disadvantages of being large in size, requiring large amounts of power for operation, and are relatively slow in operation due to the physical distance between components.

More recently, typical circuits frequently employed in constructing digital systems have been integrated onto a single chip thereby mitigating somewhat the above-described disadvantages.

With recent improvements in integrated circuit technology, a still larger number of circuit components can be integrated onto a single semiconductor chip. Thus, larger portions of the digital systems can be combined onto a single semiconductor chip. However, this improvement in the integrated circuit art has brought about different types of problems. For example, integrated circuits for digital systems were custom-made for different applications, and the cost for such custom-made circuits is prohibitive. Also, with a larger number of circuits on a single semiconductor chip, a concomitant increase in the number of pin connections to the integrated circuit chip was required.

The more recent developments of microprocessor devices has made possible the replacement of numerous custom digital circuits with one or more such programmed microprocessor devices. A microprocessor system comprises a stored-program digital system much like the well-known large computer systems. However, programming of a microprocessor is different from programming a large computer system in that the microprocessor forms a part of a larger system in many instances, and it would be helpful to the designer to emulate the operation of the microprocessor system during design of the larger system in which it is employed.

SUMMARY OF THE INVENTION

Accordingly, the present invention provides a system for emulating a microprocessor device, which is useful in development of logic designs which incorporate such microprocessor devices. In addition, the system of the present invention provides a means for creating, correcting or verifying microprocessor programs.

The present invention includes means for efficiently sharing a central processing unit by a plurality of programs in alternate execution which comprises means for selectively coupling one of the memory units to the central processing unit for program execution, and means for idling operation of other memory units with the program counters of the non-selected memory units indicating program exit point and the data pointers thereof indicating the next address for retrieval of data constants upon reselection, whereby a smooth transition is effected from the non-selected state to the selected state of the memory units.

Further, the present invention provides, in a microcomputer system having a central processing unit with at least two memory units each having a program counter and a data pointer, means for transferring data between units, and means for selectively coupling one at a time of the at least two memory units to the central processing unit, while idling operation of others of the at least two memory units.

DETAILED DESCRIPTION

Figure 1:
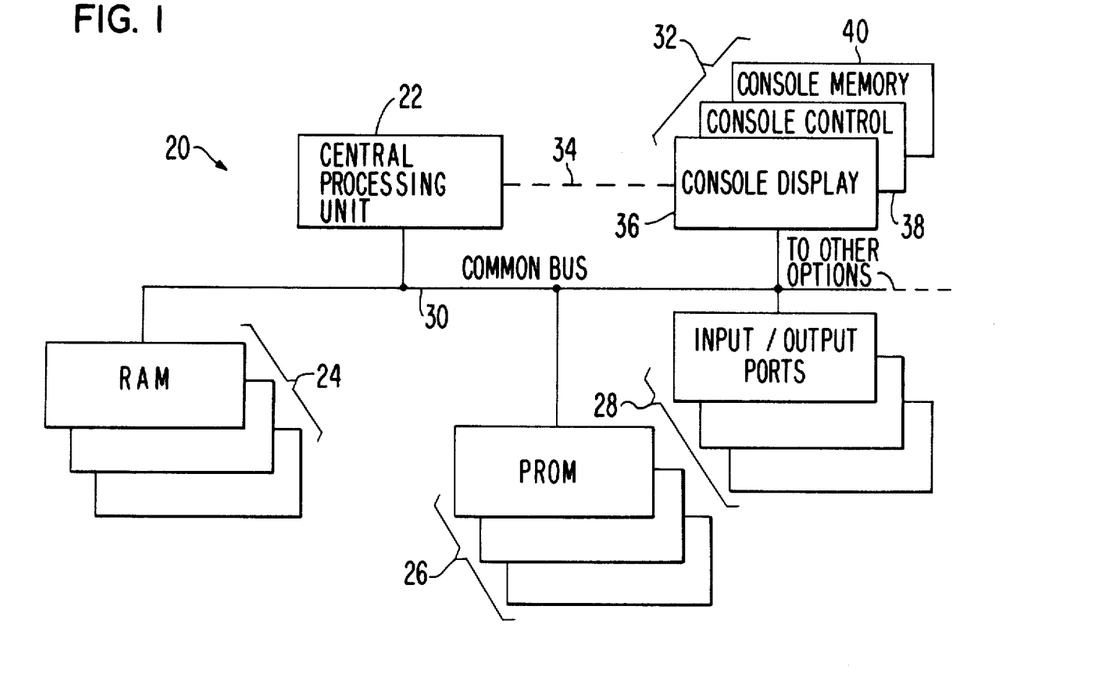
FIG. 1 is a block diagram of a microcomputer system employing the present invention.

Referring now to the drawings, and in particular to FIG. 1, a block diagram of a microcomputer system 20 in which the present invention is employed is illustrated. A central processing unit (CPU) 22 comprises the center of control for the microcomputer 20. The CPU 22 is identical to that disclosed in U.S. Pat. No. 3,984,813 which issued Oct. 5, 1976 to David H. Chung entitled "Microprocessor System," and is assigned to the assignee of the present invention. In addition, other components of the microcomputer system which are disclosed in the above-cited patent comprise random access memories (RAM) 24, programmable read only memories (PROM) 26, program storage units (PSU), and input/output (I/O) ports 28. This patent is incorporated herein in its entirety. The memories 24 and 26 and the I/O ports 28 are coupled to the CPU 22 by means of a common (data) bus 30. Other options may also be coupled to the common bus to expand the flexibility of the microcomputer system.

A second mutually exclusive memory system 32 is coupled to the microcomputer system by means of the common bus 30, and by means of additional control signal lines (control bus) represented by a dashed line 34. In particular, the mutually exclusive memory system of the present invention comprises a console display module 36, a console control module 38, and a console memory module 40. In operation, two physically separate microprocessor memory spaces are driven by a single microprocessor device. In particular, the CPU 22 drives either the memory spaces 24 and 26, or the mutually exclusive memory system 32. However, it is pointed out that more than two memory systems may be coupled to the single CPU 22 by exercising ordinary skill in the art and the present disclosure.

Figure 2:
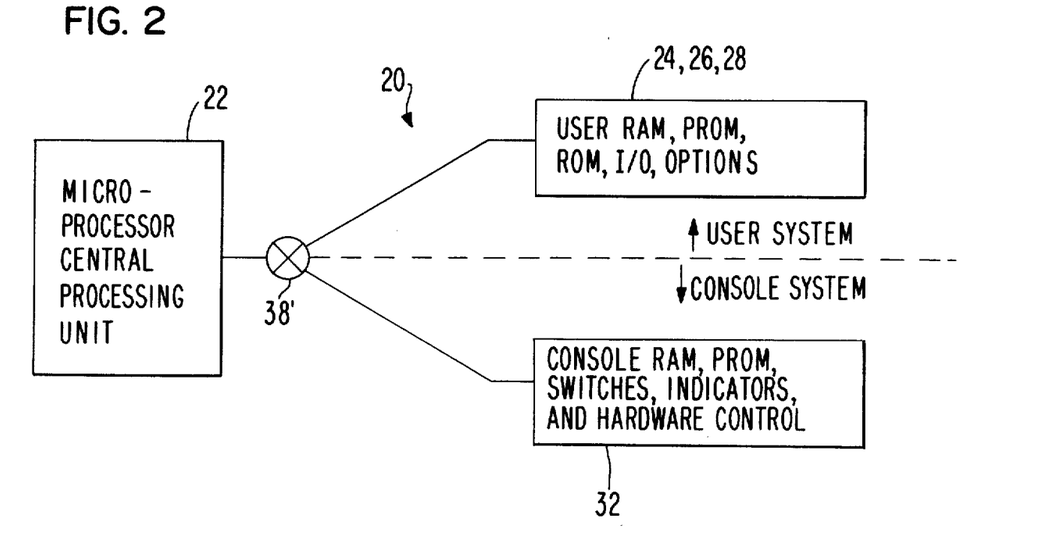
FIG. 2 is a diagram illustrating the function of the present invention.

To further understand the architecture of the present invention as incorporated into the microcomputer system 20, reference is made to FIG. 2. The single microprocessor CPU 22 is coupled to a portion of the console control module 38, which is indicated in FIG. 2 generally by a switch 38'. The switch 38' couples the single microprocessor CPU to the user RAM, PROM, ROM, I/O ports, or other options; or in the alternative, to the console RAM, PROM, switches, indicators or hardware control forming the mutually exclusive memory spaces 32. The term "user", as employed herein, refers to that portion of the microcomputer system 20, which comprises a basic microprocessor system. The user system is distinguished from the console system, which comprises the mutually exclusive memory system 32 of the present invention. The switch portion 38' of the console control module 38 switches program execution of the CPU 22 from the user memory spaces 24, 26 (RUN mode of the machine) to the console memory system 32 (HALT mode of the machine). The console memory system 32 contains the control program (intelligence) for interpreting the status of push-button switches of the console system 32, and for controlling all of the indicators associated with the console memory system.

The CPU 22 and the memories 24 and 26 with which the present invention is employed differs from classical microprocessor architecture in that the program counter and data pointers are incorporated in the memory devices themselves rather than the CPU 22. This distributed architecture makes it possible to build a microcomputer with two separate microprocessor systems (USER and CONSOLE) that share a single CPU 22.

Figure 3:
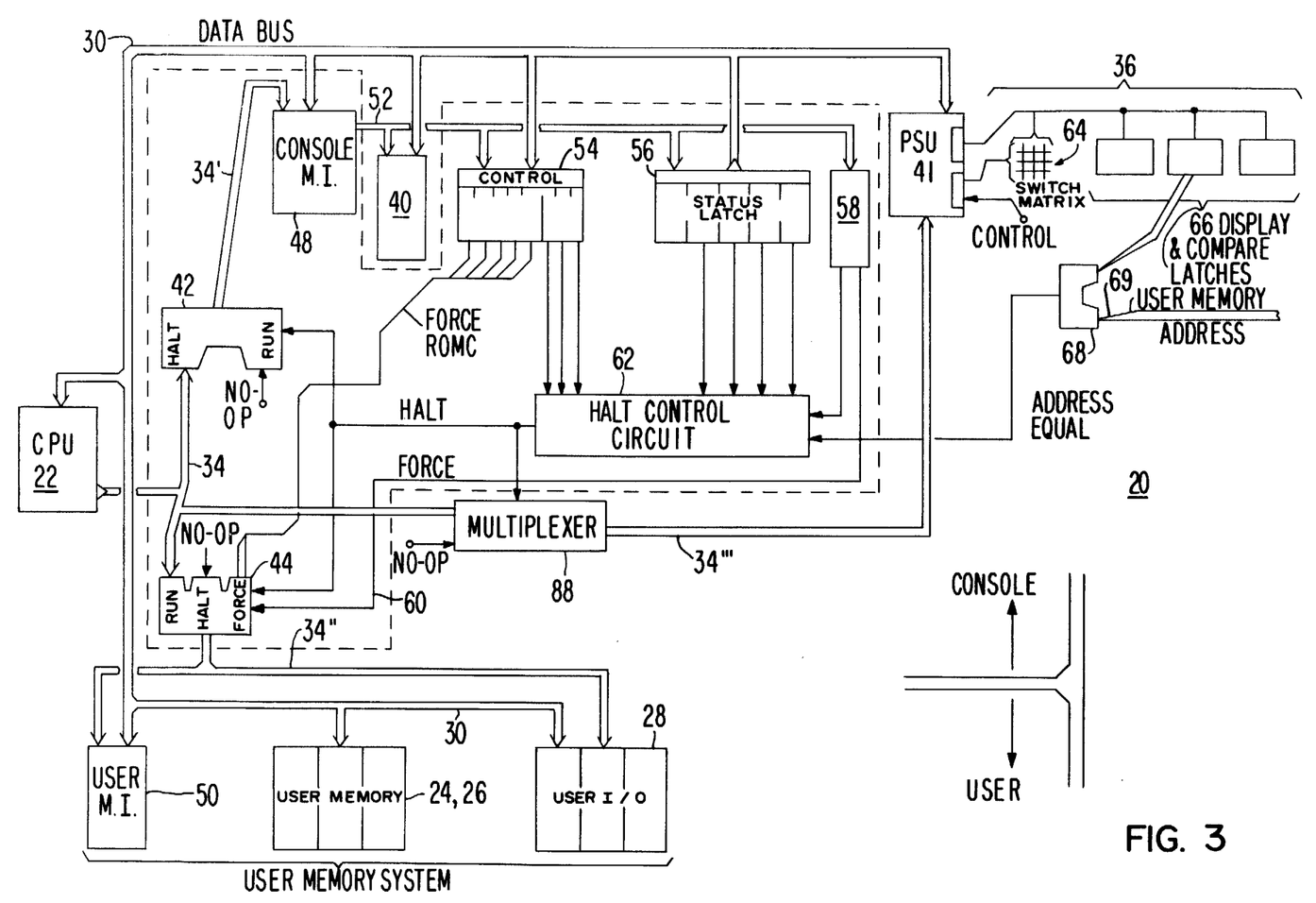
FIG. 3 is a more detailed block diagram of the microcomputer system shown in FIG. 1.

Referring now to FIG. 3 a more detailed block diagram of the microcomputer system 20 incorporating the present invention is illustrated. The common bus 30, also referred to as a "data bus", couples the CPU 22 to a program storage unit (PSU) 41 and memories within the console memory module 40, the console control module 38 and console display module 36. In addition, the data bus 30 couples the user memories 24 and 26, and the user I/O ports 28 to the CPU 22. The control bus 34 couples the CPU 22 to the switch portion 38' of the console control module 38. In particular, the control bus 34 is coupled to inputs of multiplexer circuits 42 and 44. The input of the multiplexer circuit 42, to which the bus 34 is coupled, is indicated as HALT. The term HALT refers to the mode of operation wherein the console memory system 32 is coupled to the CPU 22. The output of the multiplexer circuit 42 is supplied on a bus 34' to the input of a console memory interface circuit device 48. The console memory interface device 48 comprises a standard device as manufactured by Fairchild Camera and Instrument Corporation under the product code designation 3853. The control signals supplied on the bus 34 are designated herein as ROMC, which abbreviates "read only memory control". The signals supplied on the bus 34' at the output of the multiplexer 42 are designated herein as CROMC, which abbreviates "console read only memory control".

The bus 34 is also coupled to the input designated herein as RUN, of the multiplexer 44, which represents the mode of operation wherein the user memory spaces 24, 26 and the user I/O ports 28 are coupled to the CPU 22. The output of the multiplexer circuit 44 is supplied on a bus 34", which bus is coupled to the input of a user memory interface device 50. This memory interface device is identical to the console memory interface device 48. In addition, the bus 34" is coupled to the user I/O ports 28. The data bus 30 is also coupled to the input of the memory interface device 50, the user memories 24 and 26, and to the user I/O ports 28. A second input of the multiplexer circuit 44, designated herein as HALT, is coupled to a NO-OP signal, which constitutes an idle command to the user memory system when the console memory system is coupled to the CPU 22. In a similar manner, the RUN input of the multiplexer circuit 42 is coupled to the same NO-OP signal to supply the idle command to the console memory system when the user memory system is coupled to the CPU 22. Thus, a command to idle controls the non-selected memory spaces while the selected memory spaces are controlled by the CPU 22. In this manner a smooth transition from one memory system to the other is effected without having to reconstitute memory addresses and the like.

The output of the console memory interface circuit device 48 is supplied on a bus 52 to the input of the console memory module 40, to a "control-out" latch circuit 54, to the input of a "status-in" register 56, and to the input of a trigger and delay circuit 58. The control-out latch circuit 54 is divided into two parts. The first part being designated as FORCE ROMC. The output of this part of the control-out latch 54 is coupled to a third input of the multiplexer circuit 44, which input is designated FORCE. When the console control circuit 38 is placed in the FORCE mode of operation, ROM control signals are supplied to the user memory spaces 24 and 26, or to the user I/O ports 28, to retrieve data from the user memory system when the console memory system is coupled to the CPU 22. This operation is effected by a signal supplied on a line 60 from the output of the trigger and delay circuit 58, and is designated herein as FORCE. The FORCE signal is generated by the trigger and delay circuit 58 in response to a predetermined code generated in the console memory interface device 48 and which is supplied on the bus 52.

The second part of the outputs from the "control-out" circuit 54 and the outputs of the "status-in" register 56 are coupled to inputs of a "halt control circuit" 62. In addition, a second output from the trigger and delay circuit 58 is coupled to another input of the halt control circuit 62. The halt control circuit 62 generates the HALT signal supplied to the multiplexer circuits 42 and 44 in response to the signals supplied from the circuits 54, 56 and 58. When the HALT signal is a high-level, the console memory system 32 is coupled to the CPU 22. In particular, the ROM control signals supplied on the bus 34 from the CPU 22 are coupled through the multiplexer circuit 42 to the console memory interface device 48. At the same time, the ROM control signals are impeded from controlling the user memory systems and the NO-OP signal (idle command) is supplied to the user memory system through the multiplexer circuit 44.

One of the functions of the present invention in conjunction with the use of a single CPU and two or more mutually exclusive memory spaces is that of a development system for logic design based upon the use of microprocessor devices. That is, by the use of the system as illustrated in FIG. 3 and described hereinabove, a user could program the memory spaces of the user memory system by the use of the console memory system 32. In addition, the system of the present invention can be used in conjunction with testing of completed microprocessor systems, or diagnosing malfunctioning microprocessor systems. To this end, the console display module 36 of the memory system 32 provides a ready means for accessing the contents of the user memories and the status of the CPU 22 or the user memory system. In addition, switches are provided on the console display module 36 to thereby modify an existing program or to set up a series of sequential steps to aid in diagnosing a malfunctioning microprocessor system.

That portion of the diagram illustrated in FIG. 3 bracketed by the reference numeral 36 constitutes the console display module 36, which comprises a switch matrix 64 and display and compare latches 66. In addition, a comparator circuit 68 is coupled to the output of the display and compare latches 66 and to the user memory address bus 69 to derive a signal indicative of the console memory system being at an address equal to that in the user memory system. The details of the console display module 36 and that of the remaining portions of the console memory system 32 will be described in greater detail hereinbelow. Further details of the console memory system 32 and an explanation of operation may by had from reference to the publication by the Microsystems Division of Fairchild Camera and Instrument Corporation entitled "Hardware Reference Manual".

Figure 4:
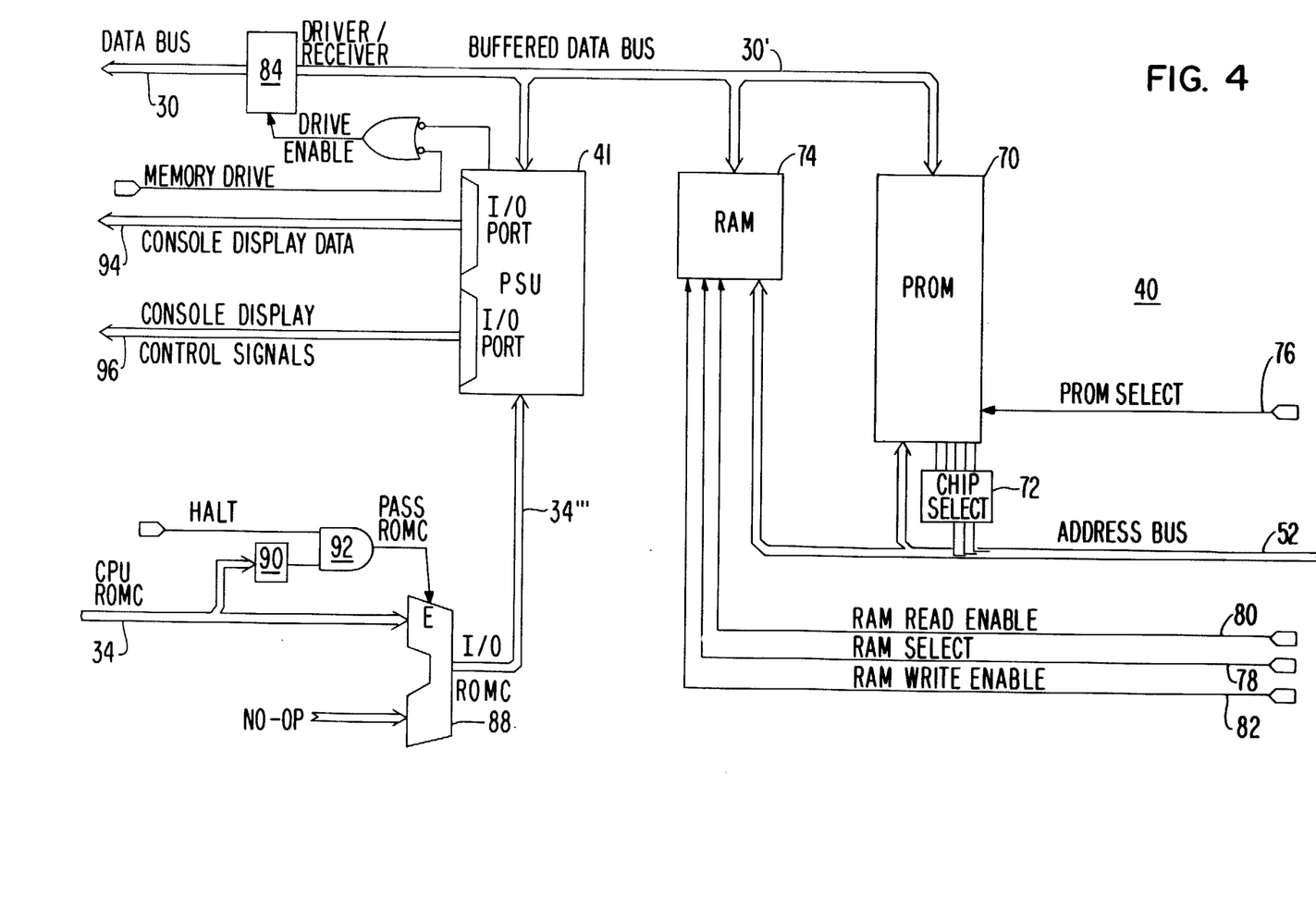
FIG. 4 is a detailed block diagram of the console memory module of the present invention.

Referring now to FIG. 4, a more detailed block diagram of the console memory module 40 is illustrated. The console memory module 40 serves primarily as a storage area for the console software. To that end, the console memory 40 contains a block of PROM memories 70, which memories hold the console's driver program. Decoding logic 72 (chip select) selects the particular bank of the block memories from which data are to be retrieved. Address bus 52, which is coupled to the output of the console memory interface device 48 (FIG. 3), is coupled to the inputs of the chip select circuit 72 and to address inputs of the PROM memories 70. In addition, the address bus 52 is coupled to the address inputs of a random access memory 74, which is also used in the console memory module 40. A "PROM select" signal is supplied to the enable input of the memories 70 on a line 76. In a similar manner, a "RAM select" signal is supplied to the enable input of the RAM 74 by means of a line 78. Further, when a random access memory is employed a selection must be made as to whether data are to be retrieved from the memory, or whether data are to be written into the memory. To that end, a "RAM read enable" signal is supplied on a line 80 to the read enable input of the RAM 74 and a "RAM write enable" signal is supplied on a line 82 to the write enable input of the RAM 74. Thus, a signal supplied on the RAM select line 78 in conjunction with a signal on either the enable signal line 80 or the enable signal line 82 will determine whether data are to be read from or written into, respectively, the RAM 74.

Data bus 30' is coupled to the data terminals of the PROM 70 and to the RAM 74. Data bus 30' is coupled to the data bus 30 by a driver/receiver circuit 84 which acts as a buffer between the console memory circuit and other data supplied on the data bus within the microcomputer system 20. Data bus 30' is also coupled to the data inputs of the PSU 41. Control signals are supplied to the PSU 41 from a multiplexer 88. A first input to the multiplexer circuit 88 is coupled to the CPU ROMC bus 34. The second input to the multiplexer circuit 88 is coupled to a NO-OP signal identical to that described above. However, the CPU ROMC signals are coupled to the control inputs of the PSU 41 only in response to preselected codes from the CPU 22. To this end, the bus 34 is coupled to the input of a gating network 90 which monitors the signals on the bus 34 for the preselected codes. Once the preselected codes have been determined, the output of the gating network 90 is provided at one of two inputs of an AND gate 92. The second input to the AND gate 92 is coupled to the halt signal from the halt control circuit 62 (FIG. 3). The output of the AND gate 92 is coupled to the enable (E) input of the multiplexer 88. Thus, when the preselected codes are detected on the bus 34 by means of the gating network 90 and the memory system is in the HALT mode of operation, then the CPU ROMC signals are passed through the multiplexer 88 to the control inputs of the PSU 41. During all other times (i.e., when the preselected codes are not present on the bus 34) the NO-OP signals are coupled to the input of the PSU 41 by means of the multiplexer 88 to thereby command the PSU 41 to be idle. A first output from the PSU 41 is supplied on a console display data bus 94 from an I/O port of the PSU. The second set of outputs from the PSU 41 are supplied on a console display control signal bus 96 from a second I/O port of the PSU.

Figure 5:
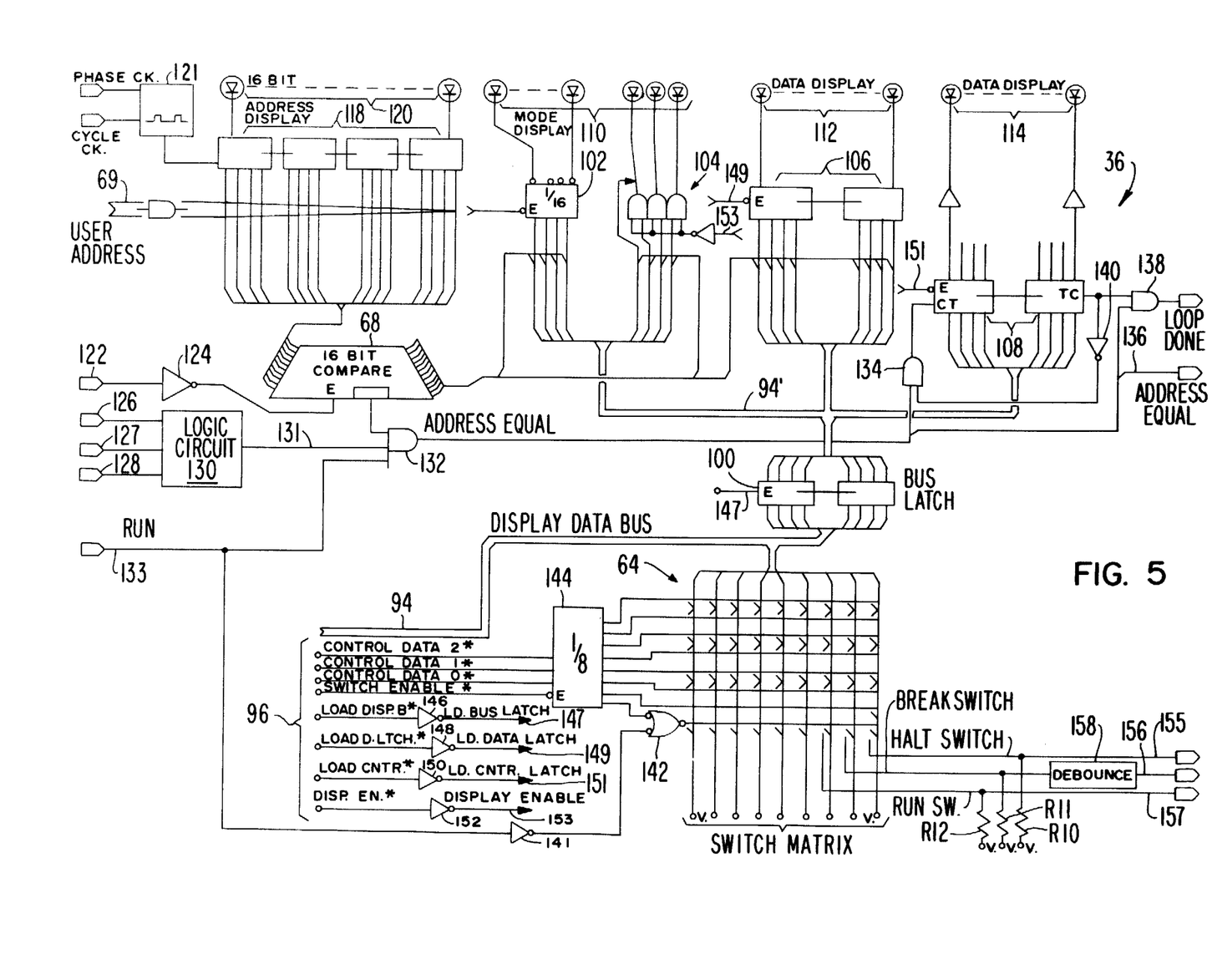
FIG. 5 is a detailed block diagram of the console display module.

Referring now to FIG. 5, a detailed block diagram of the console display module 36, including parts of the other modules of the present invention, is illustrated. The operator's display panel for the microcomputer system 20 comprises the display module containing light emitting diode indicators, switches and other components of the electronics associated with the operator's interface with the system.

Functionally speaking, the display module 36 contains address, data and mode display sections, as well as several additional indicators used to denote the current status of the microcomputer system employing the present invention. Also contained in the console display module 36 is the eight-row-by-eight column switch matrix 64, a sixteen-bit address comparator which is instrumental in a COMPARE RUN mode. The COMPARE RUN mode makes it possible to conditionally execute a program so that operation stops after a specified program and/or a selected data memory address has been encountered a fixed number of times. That is, a programmed number of iterations of the stored program can be made with reference to a selected data memory address during the COMPARE RUN mode of operation.

In addition, miscellaneous functions are performed by the console display module 36 such as hardware debouncing and synchronization of a BREAK, INTERRUPT or RESET functions. When the BREAK switch is depressed, a momentary halt in operation is effected. When the INTERRUPT switch is depressed an interrupt request is generated in the user's I/O port logic 28, which is acted upon in the same manner as described in the above-cited patent of David H. Chung. When the RESET switch is depressed the console and user programs are both reset.

The display data bus 94, which is coupled to the output of the PSU 41 (FIG. 4), is coupled to one side of the switch matrix 64 and to the inputs of a bus latch 100.

The outputs of the bus latch 100 are supplied on a bus 94' to the inputs of a one-of-sixteen decode network 102, a gating network 104, a data display latch 106, and a count latch 108. In addition, the bus 94' is coupled to one set of inputs to the sixteen-bit comparator 68.

The outputs of the one-of-sixteen decode 102 and the gating network 104 are coupled to a set of light emitting diode indicators 110. These indicators are disposed on the front panel of the microcomputer to indicate to the operator the mode of operation in which the system is presently operating. The outputs of the data display 106 and the count latch 108 are coupled to sets of light emitting diode indicators 112 and 114, respectively.

The address bus for the user memory spaces is supplied on the bus 69 to the inputs of an address display latch 118, and to a second set of inputs to the sixteen-bit comparator 68. The outputs of the address display latch 118 are coupled to a set of light emitting diode indicators 120, which indicators provide an indication to the operator the address at which the user system is being accessed. The address display latch is periodically loaded with address data in response to a clock signal from a timing network 121. The phase clock and cycle clock signals are combined within network 121 to provide a load signal during the second clock period of every machine cycle.

A signal is supplied on a line 122 from the CPU 22 to indicate that the CPU is accessing memory. That is, the signal on the line 122 indicates that the user addresses supplied on the bus 69 are valid addresses. The line 122 is coupled to the input of an inverter 124, and the output of the inverter 124 is coupled to the enable (E) input of the comparator circuit 68. Thus, a comparison of address codes is made by the comparator only when it is ascertained that the address supplied on the bus 69 is valid, and the CPU is actually accessing the user memory.

An input signal is supplied on a line 126 from the CPU 22 to the input of a logic circuit 130, which represents that the CPU 22 is reading data. A second line 127 is coupled to the input of the logic circuit 130 which transmits a signal indicating that the RAM is writing data. A third line 128 is coupled to an input of the logic circuit 130 which transmits the cycle clock signal for the microcomputer system. The logic circuit 130 is active when the user address is actually being used by the microcomputer system to access memory. That is, a signal is supplied at the output of the logic circuit 130 on a line 131 when memory access is in progress.

Line 131 is coupled to the first of three inputs of an AND gate 132. A second input of the AND gate 132 is coupled to an input line 133, which transmits the RUN signal. The output of the comparator 168 is coupled to a third input of the AND gate 132. A signal supplied at the output of the comparator 68 is indicative of an equal compare status between the input supplied from the user address bus 69 and the data display bus 94'.

The output of the AND gate 132 is supplied on a line designated ADDRESS EQUAL, which is coupled to the input of an AND gate 134, an output line 136, and an input of a second AND gate 138. The output of the AND gate 134 is coupled to the count (CT) input of the count latch 108. The second input of the AND gate 138 is coupled to the TC (terminal count) output of the count latch 108. When a signal is supplied at the TC output of the count latch 108, the count has been completed and the AND gate 138 will be enabled if the ADDRESS EQUAL output is also at a high level.

The output of the AND gate 138 is supplied on a line designated LOOP DONE which signal is employed within the console control module 38 to effect a COMPARE HALT. The TC output of the count latch 108 is also coupled to the input of an inverter 140, and the output of the inverter 140 is coupled to the second input of the AND gate 134. Therefore, when the TC output of the count latch 108 is at a low level (i.e., the count has not been completed), and the ADDRESS EQUAL output is at a high level, then the count input to the count latch 108 is at a high level to effect continuation of the count. The count latch 108 is enabled by a signal supplied on a line 152, which signal is designated herein as LD.CNTR. Accordingly, when an LD.CNTR signal is supplied at the (E) input of the count latch 108, data is loaded from the bus 94' into this latch. The LD.CNTR signal only occurs while the RUN signal is inactive and the count latch 108 is not counting.

The RUN signal supplied to the line 133 is also coupled to the input of an inverter 141, and the output of the inverter 141 is coupled to the inverting input of a NOR gate 142. The console display control signals supplied on the bus 96 from the I/O port of the PSU 41 (FIG. 4) constitute eight individual control signals as described below. The first three signals of the bus 96 constitute CONTROL DATA 0*, 1* and 2*. The asterisk following these and other signals described herein indicate that the signal is inverted (i.e., the asterisk is synonymous with the traditional Boolean symbol of a bar over a signal name). The fourth signal of the bus 96 constitutes the SWITCH ENABLE* signal supplied to the enable (E) input of a one-of-eight decode network 144.

Also, the three CONTROL DATA signals are supplied to the inputs of the one-of-eight decode network 144. A fourth signal line of the bus 96 constitutes the LOAD DISP. B* signal, which represents the load display bus signal and is coupled to the input of an inverter 146. The output 147 of the inverter 146 is the same signal as supplied at the input thereof except that the signal level has been inverted. The fifth line of the bus 96 constitutes what is designated LOAD D LTCH.* signal which represents the load display latch signal and is coupled to the input of an inverter 148. The output of the inverter 148 is coupled to a line 149. The seventh signal line of the bus 96 is designated herein LOAD CNTR.* and is coupled to the input of an inverter 150. The output of the inverter 150 is coupled to a line 151. The eighth signal of the bus 96 is designated herein DISP. EN.* and is coupled to the input of an inverter 152, and the output of the inverter 152 is coupled to a line 153.

The outputs of the one-of-eight decode network 144 are coupled to the switch matrix 64. It is the function of the decode network 144 to enable the ON and OFF sides of the switches within the switch matrix 64. The last output of the decode network 144 is coupled to a second inverting input of the NOR gate 142. The output of the NOR gate 142 is coupled to switches within the switch matrix 64.

One side of three switches within the switch matrix 64 is coupled to the HALT, BREAK, and RUN switches by means of lines 155, 156 and 157, respectively. Also, these three lines are biased through resistors R10, R11, and R12, respectively, to a voltage supply V. In addition, a de-bounce circuit 158 is coupled in series with the break switch line 156 to suppress oscillatory signals produced by the switch initially closing.

Figure 6:
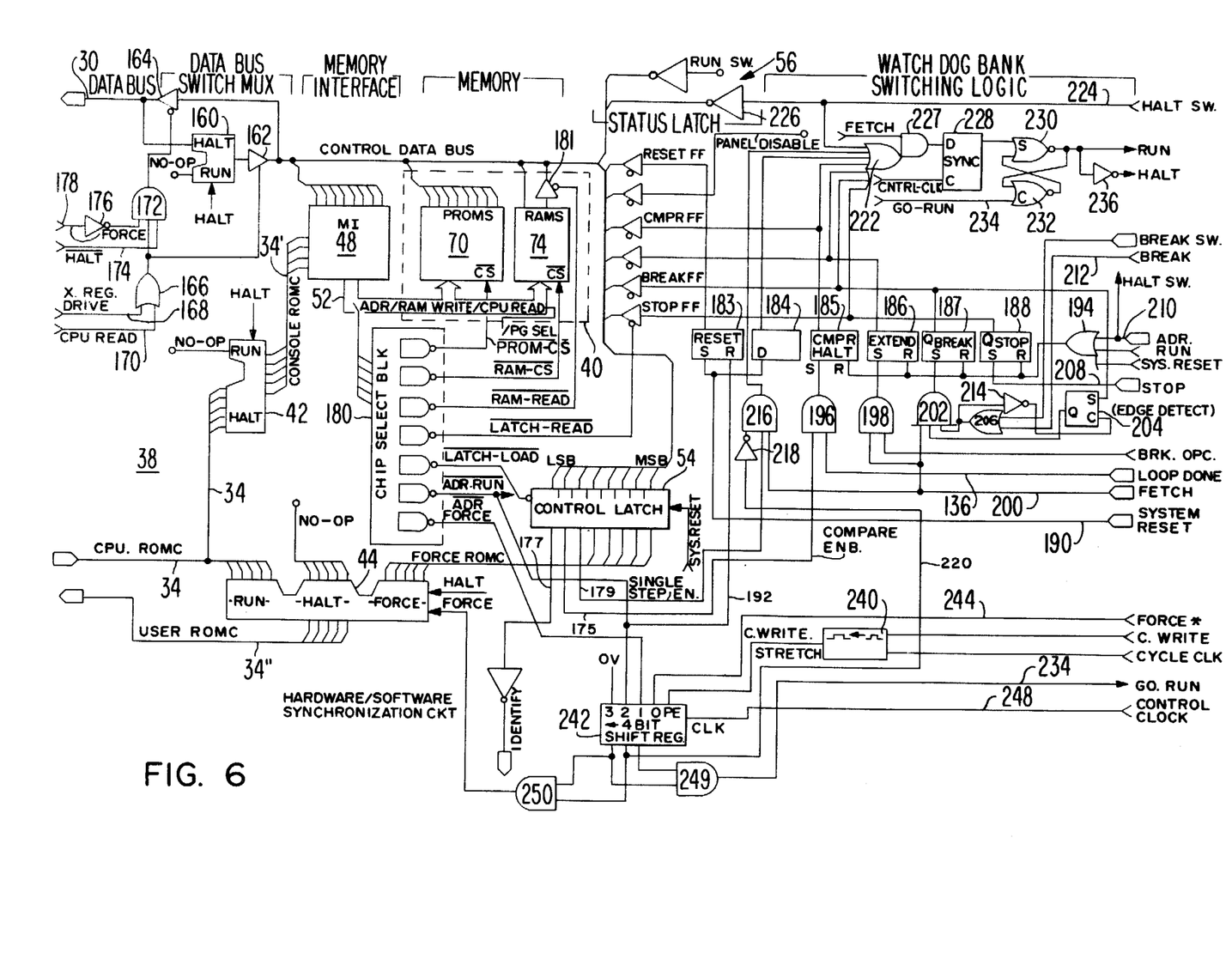
FIG. 6 is a detailed block diagram of the console control module.

Referring now to FIG. 6, a more detailed block diagram of the console module 38 is illustrated. In addition, the PROM's 70 and RAM's 74 are illustrated in FIG. 6 to show that the interconnection of these memories in the console control module 38. The CPU ROMC bus 34 is coupled to the RUN input of the multiplexer 44 and to the HALT input of the multiplexer circuit 42. An NO-OP input clock signal is supplied to the HALT input of the multiplexer 44, and to the RUN input of the multiplexer circuit 42. The output of the multiplexer 42 is coupled to the memory interface device 48 by means of the console ROMC bus 34'. The output of the multiplexer circuit 44 is coupled to the user ROMC bus 34". Accordingly, when the microcomputer system 20 is in the RUN mode of operation, the ROMC signals from the CPU 22 are coupled to the user memory spaces, and the console memory system is held in an idle state. When the microcomputer system 20 is in a HALT mode of operation the ROMC signals from the CPU are coupled to the console memory system and the user memory system is held in an idle state.

The data bus 30 of the microcomputer system 20 is coupled to the input of a multiplexer circuit 160. The RUN input of the multiplexer 160 is coupled to the same NO-OP signal as described above. The output of the multiplexer 160 is coupled to inputs of a three-state buffer network 162 (only one of which is shown). The output of the network 162 is coupled to the control data bus inputs of the memory interface device 48, the PROM's 70, and the RAM's 74. In addition, the output of the buffer network 162 is coupled to the inputs of another OR gate buffer network 164 (only one of which is shown). The output of the network 164 is coupled back to the data bus 30. Thus, the control data bus is isolated from the data bus 30 by means of the buffer network 164.

The buffer network 162 is disabled by the output of an OR gate 166, which OR gate 166 is enabled by a signal on a line designated X REG. DRIVE supplied on a line 168, or a CPU READ signal supplied on a line 170. In addition, the output of the OR gate 166 is coupled to the first of three inputs of an AND gate 172. A second input of the AND gate 172 is coupled to the inverted $\overline{HALT}$ signal suplied on a line 174. The third input of the AND gate 172 is coupled to the output of an inverter 176, and the input of the inverter 176 is coupled to a line 178 which transmits the FORCE signal. The output of the AND gate 172 is coupled to the enable input of the buffer network 164. Thus, data is coupled to the data bus 30 from the control bus only when the system is HALTED and the console memory or registers are being accessed by the CPU 22. Data from the data bus 30 is coupled to the control data bus if the system is HALTED and if the console memory or registers are not being accessed.

The output of the memory interface device 48 is supplied on the bus 52, which is coupled to the inputs of a chip select block 180, to the PROM's 70, and the RAM's 74. The outputs of the chip select block 180 are coupled to a series of NAND gates. The outputs of these NAND gates are supplied on a series of lines, the first of which is entitled $\overline{PROM\text{-}CS}$, which abbreviates a chip select signal for the block of PROM's 70. The second output from the second NAND gate in the chip select block 180 is designated $\overline{RAM\text{-}CS}$ which constitutes the chip select signal for the RAM's 74. The third output from the third NAND gate in the chip select block 180 is designated $\overline{RAM\text{-}READ}$ which provides an enable signal at the output of the RAM's 74, by means of an OR gate network 181, to the control data bus. The next output from the fourth NAND gate in the chip select block 180 is designated $\overline{LATCH\text{-}READ}$ which signal enables the status latch 56. The fifth output from the fifth NAND gate in the chip select 180 is designated $\overline{LATCH\text{-}LOAD}$ and is coupled to the enable input of the control latch 54. The outputs of the remaining two NAND gates within the chip select block 180 are provided on lines designated $\overline{ADR.RUN}$ amd $\overline{ADR.FORCE}$, respectively, which will be explained further hereinbelow. Thus, the codes supplied from the memory interface device 48 select the routing of data within the console module 38 and the console memory 40, by means of the NAND gates within the chip-select block 180.

The first five most significant bit (MSB) outputs from the control latch 54 are coupled to the FORCE input of the multiplexer circuit 44, and are designated herein FORCE ROMC. The last three least significant bit (LSB) outputs from the latch 54 are supplied on lines 175, 177 and 179. A system reset (SYS. RESET) signal is supplied to the reset input of the latch 54 to clear it when the system is being reset. The inputs of the control latch 54 are coupled to the control data bus and to the outputs of the status latch 56.

The inputs to the status latch 56 are coupled to the outputs of six flip-flops 183 through 188. The flip-flop 183 constitutes the reset flip-flop for the system, and the set (S) input of this flip-flop is coupled to the SYSTEM RESET signal supplied on a line 190. The reset (R) input of the flip-flop 183 is coupled to line 192, which transmits the RUN signal. The data (D) input of the flip-flop 184 is also coupled to the SYSTEM RESET signal line 190. The flip-flop 184 acts to halt the system after a SYSTEM RESET has occurred. The flip-flop 185 is the COMPARE HALT flip-flop for the system, and the set (S) input of this flip-flop is coupled to the output of an AND gate 196. The first of two inputs to the AND gate 196 is coupled to the line 175 at the output of the control latch 54, which transmits the COMPARE ENABLE signal. The second input to AND gate 196 is coupled to the line 136, which transmits the LOOP DONE signal from the console display module 36 (FIG. 5). The flip-flop 186 controls the EXTEND function for the system and the set (S) input of this flip-flop is coupled to the output of an AND gate 198. The EXTEND function utilizes an un-used instruction code such that whenever a user program fetches the instruction code, a HALT occurs and console routines perform some task, thereby "extending" the normal instruction set.

The reset (R) inputs of the flip-flops 185 through 188 are coupled to the output of the OR gate 194. The first of two inputs to the AND gate 198 is coupled to a line designated BRK. OPC. abbreviating BREAK OP-CODE. The second input to the AND gate 198 is coupled to a line designated FETCH supplied on a line 200. The FETCH signal is active if an instruction is being accessed from either the user or console memory.

The flip-flop 187 performs the BREAK function for the system, and the set (S) input of this flip-flop is coupled to the output of an AND gate 202. The BREAK function utilizes another normally unused instruction code to momentarily HALT user program execution, which then changes the user program counter to indicate a different designated user program, and subsequently to resume user program execution.

A first of three inputs to the AND gate 202 is coupled to the line 200, and a second input of this AND gate is coupled to the output of a flip-flop 204. The third input of the AND gate 202 is coupled to the output of an OR gate 206. The flip-flop 188 performs the STOP function of the system, and the set (S) input of this flip-flop is coupled to a line 208, which transmits the STOP signal. The user hardware can be connected to drive the STOP signal, thereby giving the same results as if the operator had pushed the HALT switch.

A first of three inputs to the OR gate 194 is coupled to the HALT switch supplied by means of a line 210. The second input to the OR gate 194 is coupled to the ADR.RUN signal, and the third input to the OR gate 194 is coupled to the SYSTEM RESET signal.

A first of two inputs to the OR gate 206 is coupled to the BREAK signal supplied on a line 212, and a second input to the OR gate 206 is coupled to the BREAK switch. The output of the OR gate 206 is also coupled to the input of an inverter 214, and the output of the inverter 214 is coupled to the reset (R) input of the flip-flop 204. The output of the flip-flop 204 is coupled to the second input of the AND gate 202. The set (S) input of the flip-flop 204 is coupled to the output of the flip-flop 187. It is the function of the flip-flop 204 to detect the edge of the BREAK signal, so that only one BREAK type of HALT occurs each time the switch is pushed.

Line 200, which transmits the FETCH signal, is also coupled to the first of three inputs of an AND gate 216. The second input of the AND gate 216 is coupled to an output of the control latch 54 and comprises the SINGLE-STEP ENABLE signal. A third input of the AND gate 216 is coupled to the input of an inverter 218, and the input of the inverter 218 is coupled to a signal designated 1st FETCH supplied on a line 220. The output of the AND gate 216 is coupled to the first of seven inputs of an OR gate 222, and the output of the gate 222 can cause a HALT after the execution of one user instruction when enabled.

A second input to the OR gate 222 is coupled to the HALT switch supplied on a line 224, which line is also coupled to the input of an inverter 226. The output of the inverter 226 is coupled to one of the lines on the control data bus. A third input to the OR gate 222 is coupled to the output of the flip-flop 184. The remaining four inputs to the OR gate 222 are coupled to the outputs of the flip-flops 185, 186, 187 and 188, respectively. The output of the OR gate 222 is coupled to the first of two inputs of an AND gate 227. The second input to the AND gate 227 is coupled to the FETCH signal. The output of the AND gate 227 is coupled to the data (D) input of a flip-flop 228. The clock (C) input to the flip-flop 228 is coupled to the control clock signal (CNTR-CLK). The output of the flip-flop 228 is coupled to the first of two inputs of a NOR gate 230. The second input to the NOR gate 230 is coupled to the output of a second NOR gate 232. A first of two inputs of the NOR gate 232 is coupled to a signal entitled GO-RUN signal supplied on a line 234. The output of the NOR gate 232 is coupled to the second input of the NOR gate 230, and the output of the NOR gate 230 is coupled back to the second input of the NOR gate 232. In addition, the output of the NOR gate 230 constitutes the RUN signal for the system. The output of the NOR gate 230 is also coupled to the input of an inverter 236. The output of the inverter 236 constitutes the HALT signal for the system.

The CONSOLE WRITE and the CYCLE CLOCK signals are supplied to the inputs of a timing network 240. The timing network 240 combines these two signals to provide an extended clock signal designated CONSOLE WRITE STRETCH signal which is coupled to the load input (PE) of a four bit shift register 242, which will be active when the console memory system executes the "write-to-memory" operation. The zero-bit input position of the register 242 is coupled to the $\overline{\text{FORCE}}$ signal supplied on a line 244. The "one" bit input position of the shift register 242 is coupled to the $\overline{\text{ADR.FORCE}}$ signal from the chip select block 180. The "two" bit input position of the register 242 is coupled to the ADR.RUN signal also from the chip select block 181. The clock (CLK) input of the register 242 is coupled to the control clock signal supplied on a line 248. A second output of the shift register 242 is coupled to the first of two inputs of an AND gate 249. The third output of the shift register 242 is coupled to AND gate 250, which transmits the 1st FETCH signal. In addition, the third output is coupled to the first of two inputs of an AND gate 250. The fourth output from the shift register 242 is coupled to the second input of the AND gates 249 and 250. The output of the AND gate 250 constitutes the FORCE signal supplied to the force input of the multiplexer 44. The output of the AND gate 249 constitutes the GO-RUN signal supplied on the line 234.

The function of the shift register 242 is to synchronize the HALT-to-RUN transition with execution of the console program. The shift register 242 also synchronizes the extracting or interjecting of user information by the console system 32. The outputs of the shift register 242 become active slightly after the register has been loaded by network 240; provided, however, that either the $\overline{\text{ADR.RUN}}$ or the $\overline{\text{ADR.FORCE}}$ signals from the chip select block 180 is active.

At this juncture of the disclosure a description of the theory of operation of the console control module 38 is given. The console control module 38 is the demarcation point between the user's microprocessor system and the console microprocessor system. The hardware comprising this module shares the single CPU 22 between the two microprocessor systems and determines which system is currently active. Also, this module includes hardware which allows the console system to examine the contents of the user memory system.

Two separate microprocessor systems exist within the microcomputer system 20. The user's microprocessor system comprises the CPU 22, memories 24 and 26, and I/O ports 28. In general, the user system is defined by the user to fit his needs. The console microprocessor system on the other hand is a small dedicated system whose job it is to freeze operation of the user system to allow examination of the status and contents of the user system.

The objects of the console function are: to be able to examine all user registers; to be able to alter all user registers; to halt operation without destroying contents within the user system; to be able to continue with all user parameters restored so that it appears that nothing had happened; to not restrict the configuration of the user system; to not deprive the user of memory or I/O ports; to be able to execute a single instruction; to be able to display the program counter contents while running; and, to be able to halt the system at some specified program point.

These goals are met by the console microprocessor system in conjunction with the special hardware tools that let the console system delve into the user system. A microprocessor system is used because it puts the complex portions of the console function into a software program that is stored in simple memory. The microprocessor system also allows flexibility and convenient inclusion of features that are logically simple, but in hardware would be complex viz. switches that repeat if held down. The CPU 22 is a part of both systems, i.e., the CPU 22 is shared between the two systems. Each system has its own memory interface logic, its own memory, and its own I/O structure; however, neither system has its own dedicated CPU. When running (RUN mode), the CPU 22 is attached to the user system and the memory structure of the console system is held idle. As the system is halted, the CPU 22 is transferred to the console system and the user's memory structure is now held idle. With the transfer of the CPU 22 to the console system, the console microprocessor system has just gained access to the large number of registers contained within the user system including the user's status registers.

Figure 7:
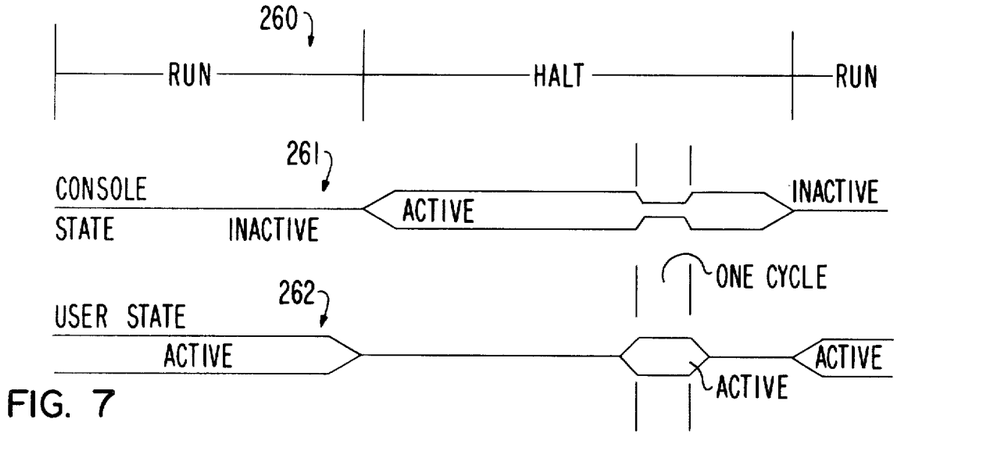
FIG. 7 is a generalized timing diagram of the RUN versus HALT mode of operation.

Additional hardware within the console control module allows the console system (by means of the console display module) to look into the user memory structure while in the HALT mode of operation. The user's I/O ports, program counters, data counters, and actual memory will all look like a part of console memory to the console microprocessor system. It is also possible within the console control module 38 to force commands into the user memory system while the console is executing some memory reference instructions. An overview of the timing relation of these events is given in FIG. 7. Waveform 260 illustrates a time demarcation between RUN and HALT operations of the microcomputer system. Waveform 261 indicates the status of the console system during these states of the system operation. Waveform 262 indicates the state of the user memory system during the same time demarcations illustrated in waveform 260.

The hardware within the console control module which controls the RUN/HALT status is also considered part of the console function. A transition to HALT is triggered by hardware-monitored conditions. The transition to RUN state is in response to a command issued by the console microprocessor system. SINGLE-STEP and COMPARE-HALT are conditioned forms of RUN; the condition flags are passed to the Hardware. The HALT conditions are: HALT, RESET, BREAK SWITCH PUSHED; STOP LINE ACTIVATED; SINGLE-STEP or COMPARE-HALT conditions satisfied; or BREAK instruction encountered in the user's program.

While the user system is held idle in the HALT state, its clocks are not stopped; interval timers will continue to count down while the system is halted. Interrupts may become pending during the HALT state but they will not be serviced until a return to the RUN mode of operation. The idling of the console memory structure or the user memory structure is accomplished by switching the ROMC signals by means of the multiplexers 42 and 44. These control signals originate in the CPU 22 and direct the action in the memory structures. The ROMC signals are fed to the user when the mode is RUN, and are fed to the console when HALTED. The inactive memory structure is provided with a NO-OP ROMC signal to hold that memory structure in an idle state.

Figure 8:
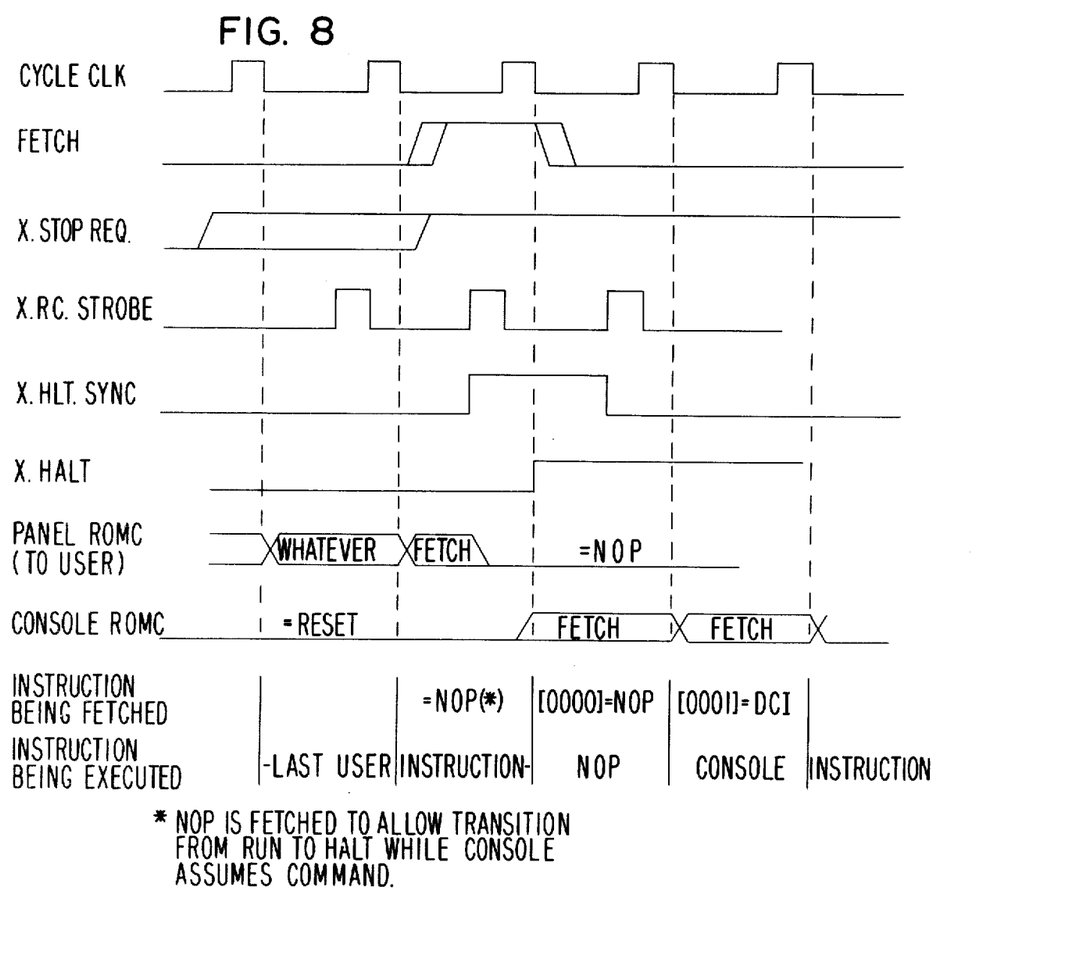
FIG. 8 is a timing diagram of the RUN-to-HALT transition.
Figure 9:
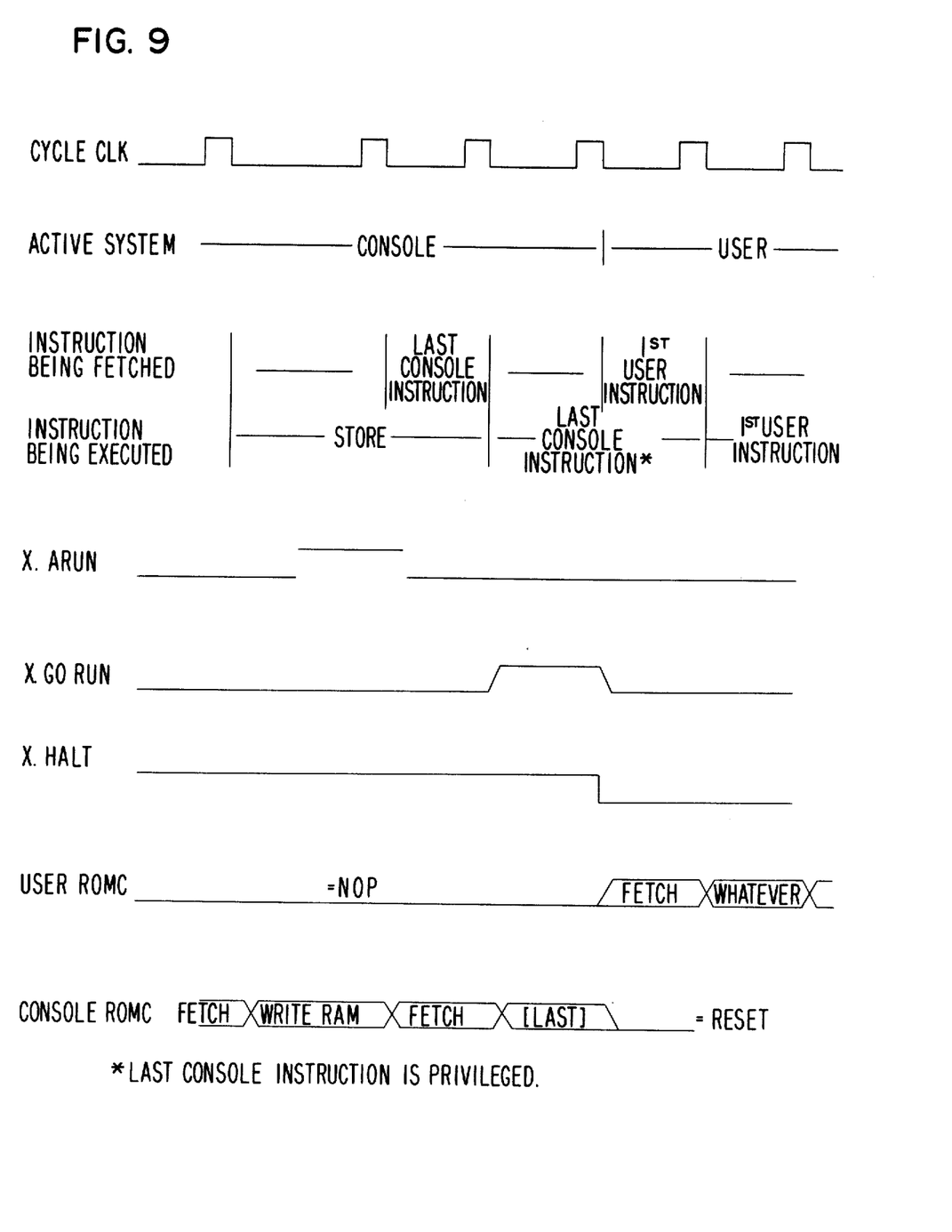
FIG. 9 is a timing diagram of the HALT-to-RUN transition.

FIG. 8 illustrates the RUN-to-HALT transition, and FIG. 9 illustrates the converse, HALT-to-RUN, transition. Further details of the timing diagrams illustrated in FIGS. 8 and 9 may be had by reference to the HARDWARE REFERENCE MANUAL incorporated by reference hereinabove.

Figure 10:
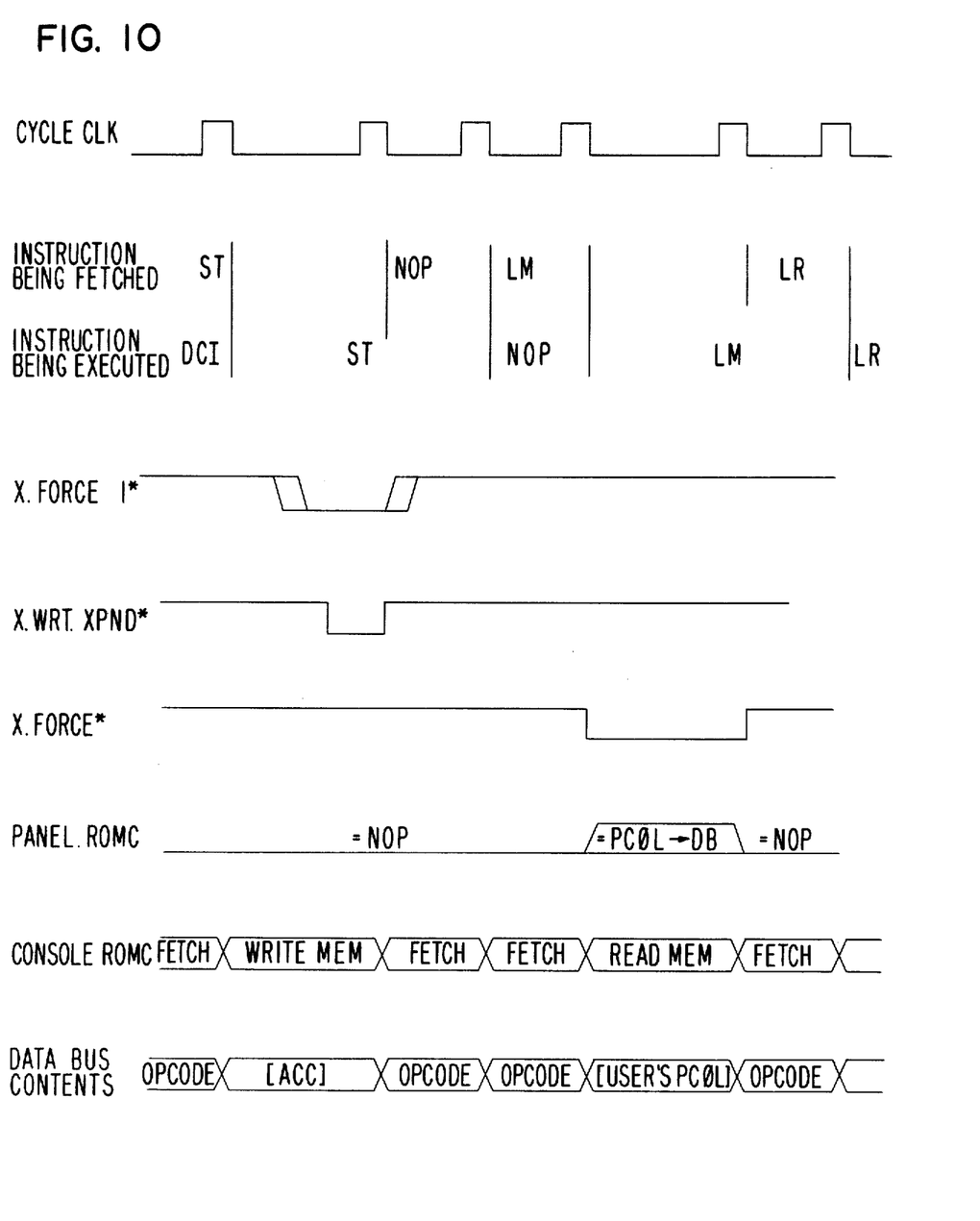
FIG. 10 is a timing diagram of the FORCE timing.

As stated above, the user memory system may be accessed by the console control module 38 while the microcomputer system is in a HALT mode of operation. This accessing the user memory system is accomplished during what has been described hereinabove as the FORCE mode of operation. FIG. 10 illustrates the timing for the FORCE mode of operation. Again, a more detailed description of the timing diagram illustrated in FIG. 10 may be had by the above-cited HARDWARE REFERENCE MANUAL which is incorporated herein by reference.

From the foregoing detailed description, it will be evident that there are a number of changes, adaptations, and modifications of the present invention which come within the province of those skilled in the art; however, it is intended that all such variations not departing from the spirit of the invention be considered as within the scope thereof as limited solely by the appended claims.

We claim:

1. A microprocessor system wherein a plurality of subsystems shares a single central processing unit comprising:
   a central processing unit;
   a console subsystem including a memory, said console subsystem memory including a program counter for indicating the point of execution of an interruptable program and a data pointer identifying the location in the console subsystem memory of data being processed by the program in execution,
   at least one user subsystem including a memory, said user subsystem memory including a program counter for indicating the point of execution of an interruptable program and a data pointer identifying the location in the user subsystem memory of data being processed by the program in execution,
   a data bus operatively connected with the central processing unit and said console subsystem and said at least one user subsystem, for transferring data between said central processing unit and said console subsystem and said at least one user subsystem, and
   a console control module interconnected with said data bus, said console subsystem, and said at least one user subsystem and controlling operation of said central processing unit with said console subsystem and said at least one user subsystem, the point of interruption of program execution in said console subsystem and in said user subsystem being indicated by said program counter and said data pointer within each subsystem.

2. A microprocessor system as defined by claim 1 and further including a pair of multiplexer circuits operatively connected with said console control module, said central processing unit, and each subsystem, said pair of multiplexer circuits controlled by said console control module for selectively coupling each of said subsystems to said central processing unit.

3. The microprocessor system of claim 2 and further comprising means for transferring data from one of said subsystems to the other of said subsystems.

* * * * *